United States Patent Office 2,989,975
Patented June 27, 1961

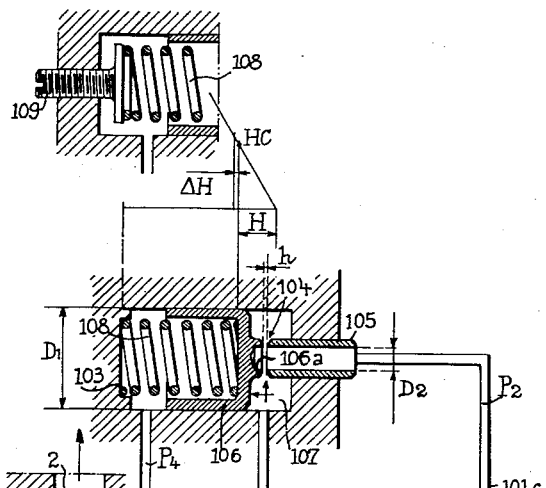
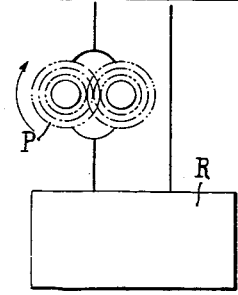
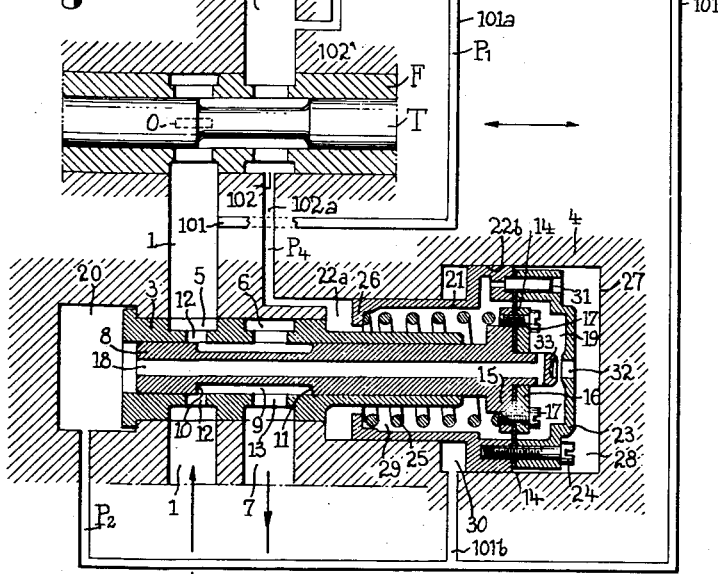

2,989,975
VALVE REGULATING THE PRESSURE DROP OF A LIQUID FLOWING THROUGH AN APERTURE HAVING A VARIABLE CROSS-SECTIONAL AREA, NOTABLY FOR A TURBINE MACHINE REGULATOR
Berthold Gärtner, Paris, France, assignor to Bronzavia S.A., Courbevoie (Seine), France, a corporation of France
Filed May 15, 1958, Ser. No. 735,497
Claims priority, application France Jan. 7, 1958
3 Claims. (Cl. 137—117)

The present invention relates to devices for maintaining constant the drop in the pressure of a liquid flowing through an aperture having a variable cross-sectional area. In the case of metering apertures the pressure drop may be regulated by regulating a discharge of excess liquid delivered to the input side of the aperture.

A device of this kind is of use in particular in fuel regulators for turbine machines, for example in the regulator described in the French Patent No. 1,070,629, filed on December 24, 1952, in the name of the company: Bronzavia S.A.

The known devices of the above-mentioned type consist of a valve comprising a slide which moves inside a sleeve and uncovers in the course of its movement an aperture which allows the excess fuel to be discharged. This aperture is referred to in the ensuing description as the discharge aperture. The slide is connected to a diaphragm which measures the difference between the pressures prevailing on each side of the discharge aperture (this difference is hereinafter referred to as the pressure drop) and a spring balances the forces exerted on the diaphragm and regulates the value of this pressure drop in the known manner.

The valves which normally comprise these elements are such that the regulated value of the pressure drop varies with the flow of discharged fuel. The slide connected to the diaphragm moves to vary the cross-sectional area of the discharge aperture and brings about a modification in the compression of the spring and in consequence a modification of the regulated value of the pressure drop.

It is also known to construct a regulating valve which comprises, in addition to the aforementioned elements, a servomotor adapted to move the support for the end of the spring which is remote from the diaphragm in such manner that the compression of the spring remains constant, whereby the regulated value of the pressure drop also remains constant.

In the accompanying drawing FIG. 1 is a diagrammatic sectional view, by way of example, of an embodiment of a valve of this known type the description of which will now be given for the purpose of better explaining the present invention.

This valve maintains constant the pressure drop or difference between the pressures prevailing on the upstream and downstream sides (relative to the fuel flow) of a fuel metering aperture. This aperture O is formed by a slide or valve member T which moves in a cylinder F. The latter is supplied with fuel through a supply pipe 1 containing fuel under pressure and the metered fuel passes out through a delivery pipe 2 to the means using this fuel, for example the burners of the combustion chambers of the turbine. The variable cross-sectional area of the metering aperture O corresponds to the portion *a* of the pipe 2 uncovered by the shoulder E of the slide T.

The regulating valve proper comprises a fixed sleeve 3 mounted in a fluid-tight manner in a body 4. This sleeve is provided with two recesses in which are formed apertures, that is, a recess 5 which communicates with the fuel supply pipe 1, and a recess 6 which communicates with a pipe 7 through which the excess fuel is discharged. Slidable in the sleeve 3 is a slide 8 which comprises a recess 9 defined by shoulders 10 and 11. The cross-sectional area of the discharge aperture varies in accordance with the extent to which the apertures 12 in the recess 5 are uncovered by the shoulder 10.

The discharged fuel passes through the recess 9 and the apertures 13 into the pipe 7. The slide 8 is connected to an annular diaphragm 14 held against a flange 15 of the slide by a plate 16 and screws 17. An axial passageway 18 provided in the slide 8 communicates at one end with a chamber 19 and at the other with a chamber 20 which communicates with the pipe 1 through a pipe 1*a*.

The servo-motor is of the follow-up piston type. It consists of a hollow differential piston 21 which slides in a bore 22*a* and an enlarged bore 22*b* formed in the body 4. The outer periphery of the diaphragm 14 is clamped against an enlarged portion of the piston 21, which slides in the bore 22*b*, by a cover 23 and screws 24. The cover 23, the diaphragm 14 and the plate 16 define the chamber 19. A helical spring 25, disposed within the piston 21, bears at one end against an inner flange 26 of the piston 21 and at the other end against the left face (as seen in the figure) of the flange 15 of the slide 8.

A cover 27 surrounding the cover 23 defines with the piston 21 a chamber 28.

The diaphragm 14 divides the bore of the piston 21 into a right chamber 19, already mentioned, and a left chamber 29. The enlarged portion of the piston 21 defines with a part of the small portion of the piston 21 and the body 4 a further chamber 30.

The chamber 28 communicates with the chamber 29 through an orifice 31 of very small cross-sectional area. The chamber 28 also communicates with the chamber 19 through an adjustable jet or orifice, this jet being formed by an aperture 32 in the cover 23 and a face 33 formed in the slide 8. The flow through this jet varies with the distance between the face 33 and the cover 23.

The chamber 30 communicates with the fuel supply pipe 1 through a pipe 1*b*. This chamber is therefore subjected to the pressure of the fuel delivered to the metering aperture, that is, to the upstream fuel pressure relative to the direction of flow of fuel through this aperture. The chamber 19 communicates with the pipe 1 through the passageway 18 and is in consequence also subjected to said upstream pressure. The chamber 29 communicates with the pipe 2 through a pipe 2*a* and is therefore subjected to the pressure of the fuel on the outlet side of the metering aperature or the downstream pressure.

The function of the regulating valve is to maintain constant the difference between the pressures in the chambers 19 and 29 in which prevail said upstream and downstream pressures respectively.

The regulating valve operates in the following manner:

Assuming that the fuel arrives through the pipe 1, the fuel supply pressure prevails in the chamber 30 and shifts the servo-piston 21 to the right as seen in the FIGURE 1.

Through the medium of the spring 25 and the diaphragm 14, the piston 21 moves the slide 8 to the right and closes the discharge apertures 12.

The fuel flows through the metering aperture O into the pipe 2 and the pressure in the latter rises, since the flow of the fuel at the delivery end of the pipe 2 is restricted by the small cross-sectional area of the burners. As the fuel flow in the pipe 1 is greater than that through the burners, the pressure in the pipe 1, and in consequence in the chamber 19, rises and the pressure in the latter eventually reaches such value as to counterbalance the effect of the pressure in the chamber 29 and of the thrust of the spring 25 against the diaphragm 14. At this instant the face 33 is no longer applied against the cover 32 and the diaphragm is in equilibrium between the force due to the pressure prevailing in the chamber 19 and the force due to the pressure prevailing in the chamber 29 to which is added the thrust of the spring.

In both cases the upstream and downstream pressures act on the same operative diaphragm surface, the latter being substantially represented by the area of the diaphragm less the cross-sectional area of the slide 8, the latter area being exposed on the left and right sides to the same upstream pressure. In the chamber 19 the slight pressure variation occurring in the region of the jet 32 is negligible in view of the small cross-section area of this jet relative to the area of the diaphragm.

The force due to difference between the pressures prevailing in the chambers 19 and 29 is therefore equal to the thrust of the spring 25 and if the compression of the latter remains constant the difference between the pressures would remain constant.

Let it now be assumed that the size of the metering aperture O is reduced.

The pressure in the pipe 1 and in the chamber 19 tends to rise, assuming that the flow in the pipe 1 remains constant, and this causes the slide 8 to move to the left and increase the cross-sectional area of the discharge aperture.

If the servo-piston remained stationary, the spring 25 would be compressed still more and the difference in the pressures in the chambers 19 and 29 would increase, but as the diaphragm moves to the left the distance between the face 33 and the cover 23 increases. The flow of fuel into the chamber 28 increases and thereafter passes into the chamber 29 through the orifice 31. As the flow of fuel is restricted by the orifice 31 the pressure in the chamber 28 rises with increase in the distance between the face 33 and the cover 23 and there occurs an instant when the pressure forces exerted in the chamber 28 on the end of the enlarged portion of the piston 21 exceed the opposing forces. The servo-piston then moves to the left until it resumes its initial position relative to the diaphragm. The compression of the spring is then identical to its initial value and in consequence the same is true of the difference between the pressures in the chambers 19 and 29.

If the size of the metering aperture is increased, a similar reasoning would show that the pressure in the chamber 28 has a tendency to drop and the servo-piston has a tendency to move to the right.

Theoretically a regulating valve (hereinafter termed $\Delta p$ regulator) having these features should exactly regulate the chosen pressure drop $p$. It has been confirmed by arrangements in which the momentum of the liquid flow through the input aperture in the regulator and the output aperture toward the discharge varies but little. But if such a regulator is used for regulating the fuel supply to an aircraft engine the fuel flow it must discharge could vary in the ratio of 20:1 corresponding to a modification of the pressure drop through said apertures in the ratio of about 1:10 which results in great differences in the projected momentums acting on the slide. The different angles and the different speeds between the input and the output of the discharge flow are the cause of very variable dynamic forces or stresses which are partly applied to the lateral faces of the distributing recess. There results, despite the symmetry of this recess, the axial forces which are added to that of the opposing spring or are subtracted therefrom.

An object of the invention is to provide an improvement in the regulating valve of the aforementioned type, this valve being characterized in that it comprises a device adapted to compensate the effect on the slide of the longitudinal component of the resultant of the forces created by the momentum of the flow of liquid through the input and output aperture of the valve toward the discharge.

According to another feature of the invention, said device comprises an automatic regulating jet inserted in the fuel path or circuit between pressure communication apertures on the upstream and downstream sides of the metering aperture, in which circuit is inserted the $\Delta p$ regulator mentioned hereinbefore. This jet creates an adjustable supplementary pressure drop which exactly compensates for the variation in the $\Delta p$ of the regulator.

In this fuel circuit the jet could be located on the upstream or the down-stream side of the $\Delta p$ regulator.

In one embodiment of the invention, this jet—which is interposed between a pressure communication aperture located on the upstream side of the metering aperture and the upstream side of the $\Delta p$ regulator—comprises a fixed element communicating with the entrance of the $\Delta p$ regulator and a moving element connected to a piston of which one face or end is subjected to the action of a calibrated spring and to the pressure on the downstream side of the metering aperture, the other end of said piston being subjected partly to the action of the inner pressure of the jet and partly to the action of the pressure on the upstream side of the metering aperture.

In another embodiment, said jet—which is interposed between the outlet of the regulator and a pressure communication aperture located on the downstream side of the metering aperture—comprises a fixed element connected to the outlet of the $\Delta p$ regulator and a moving element connected to a stepped piston subjected in one direction to the action of a calibrated spring, partly to the downstream pressure of the metering aperture and partly to the downstream pressure of the $\Delta p$ regulator, and, in the other direction, to the action of the pressure on the upstream side of the metering aperture.

In the accompanying drawings, given merely by way of example:

FIG. 2 is a diagrammatic view of a regulator embodying the invention;

FIG. 3 is a modification of a detail of the invention, and

A certain number of elements are identical or similar to those shown in FIG. 1 and therefore carry the same reference characters as the elements shown in FIG. 1.

Figure 1:
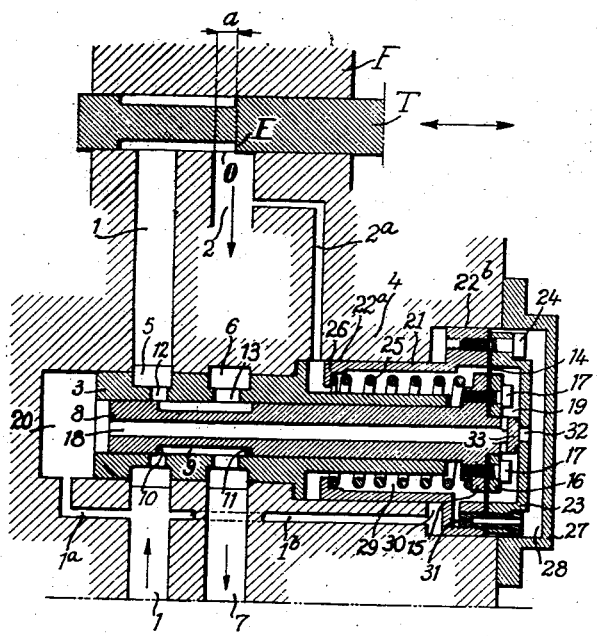

The fuel is drawn by a pump P from a reservoir R and pumped through the fuel supply pipe 1. The discharge or escape of fuel to the reservoir is by way of the pipe 7. The reference numeral 2 designates the delivery pipe feeding the burners.

It will be observed that in a slide regulator of this previous type, when the resultant of the dynamic forces due to the momentums of the liquid passing through the apertures 12 and exerting pressure on the wall 10, and of the liquid discharged through the apertures 13 and exerting pressure on the wall 11, is directed toward the right (as viewed in FIG. 2), that is, against the pressure responsive diaphragm 14, the longitudinal component of this resultant force is added to the force of the opposing spring 25 and this is manifested by a slight increase in the difference $\Delta p$ of the device shown in FIG. 1, i.e., the difference between the pressures on the upstream and downstream sides of the fuel metering aperture O, the purpose of the regulator of the present invention being to maintain this difference constant.

Thus, if there is considered a basic circuit which starts at an upstream pressure communication aperture 101 and comprises pipes 101a, 101c, the adjustable jet 32 and the fixed jet 31, and a pipe 102a connected to a downstream pressure communication aperture 102, the flow through this circuit—determined by the cross-sectional area of the jet 31 and by the $\Delta p$ value of the valve shown in FIG. 1 also increases and slightly raises the modulated pressure in the chamber 28. This system becomes balanced in this case under the following conditions. If the effective opening of the metering aperture O remains unchanged, the flow of fuel to the engine is substantially increased, firstly due to the increase in the flow in the circuit between the pressure communication apertures (this is the "basic flow") and, secondly, due to the increase in the pressure drop on the upstream and downstream sides of the metering aperture.

According to the invention, the regulator comprises a device 103 adapted to remedy this modification of the $\Delta p$.

This device comprises (FIG. 2) an adjustable jet 104 which is inserted in said basic circuit and thus creates an additional pressure drop in this circuit. It will be observed in this respect that for the same pressure difference on either side of the metering aperture O, the calibration of the opposing spring 25 must be in consequence decreased relative to that of the spring of a $\Delta p$ regulator mounted in the device 103. In this first embodiment, this jet is disposed between said upstream pressure communication aperture and the inlet of the regulator. This jet is constituted by a chamber of length $h$ located between a fixed tube 105 and a movable seat or face 106a facing the end of the tube 105.

The movable seat or face 106a of the jet 104 is connected to a pressure responsive or detecting piston 106 whose right end (as viewed in FIG. 2) is subjected, in respect of the part corresponding to the cross-sectional area of the seat, to the pressure $P^2$ on the upstream side of the $\Delta p$ regulator in the pipe 101c, and, in respect of the part corresponding to the annular cross-sectional area 107, to the pressure $P_1$ on the upstream side of the metering aperture in the pipe 101a. The left end of the piston 106 is subjected to the pressure $P^4$ on the downstream side of the metering aperture. An opposing spring 108 also bears against this side thereby balancing the difference between the resultant forces.

The device therefore regulates the total $\Delta p$, that is, the pressure drop in the jet 104 to which is added the partial $\Delta p$ regulated by the regulator. The total $\Delta p$ must be invariable notwithstanding the increase in the partial $\Delta p$ of the regulator, and the displacement of the piston 106, determined by the characteristics of the opposing spring 108, must be such that the decrease in the pressure drop in the jet 104 exactly compensates the increase in the partial $\Delta p$ of the regulator.

The following characters will be used in the ensuing description:

$D_1$=the maximum outside diameter of the piston 106.
$D_2$=the inside diameter of the jet tube 105.
$H$=the reduction in the length of the spring due to compression resulting from the action of the static forces.
$C$=the constant of the spring 108 so that HC represents the force exerted by this spring.
$\Delta P_2$=the increase in the pressure $P_2$ under the effect of the dynamic forces exerted on the distributor slide.
$\Delta H$=the increase in H under the effect of these dynamic forces.

The conditions for equilibrium are obviously:

(a) In the absence of dynamic forces on the distributor slide $$D_1^2\pi/4.P_4+H.C=(D_1^2-D_2^2)\pi/4.P_1+D_2^2\pi/4.P_2$$

(b) In the case of dynamic forces on the distributor slide:

$$D_1^2\pi/4.P_4+(H+\Delta H).C=(D_1^2-D_2^2)\pi/4.P_1+D_2^2\pi/4(P_2+\Delta P_2)$$

In subtracting the first equation from the second, the following equation for the final condition is obtained:

$$\Delta H.C=D_2^2\pi/4.P_2$$

To summarize, it is observed that the pressure drop on either side of the metering aperture O is maintained strictly constant owing to the device of the invention and no variation in the flow can occur for a given opening of the metering aperture.

The compensation obtained by means of the device does not eliminate a slight variation in the flow between the pressure communication apertures, but this flow, which is added to the regulated flow, represents but a very small part of the latter. As the aforementioned variation is in itself very small, the resultant error is of the second order relative to the regulated flow.

As access to the opposing spring 25 of the $\Delta p$ regulator is difficult if not impossible, the left support of the spring 108 of the device (FIG. 3) could be rendered adjustable by arranging that the left end of this spring bear against a flange or head of a screw 109 screwed in the housing and accessible from outside the latter. In this way there is obtained a convenient means of adjusting the value to be regulated.

The regulation of the stress of the spring 108 presents another very appreciable advantage in the case of variations in the specific weight $\gamma$ of the fluid whose volumetric flow through the metering aperture, as shown in FIG. 2, is desired to be measured.

A rate of increase of, for example, $\gamma$, corresponds to a decrease in the volumetric flow proportional to $\sqrt{1/\gamma}$ for a given opening of the metering aperture and a strictly constant total $\Delta p$. In compensating for this effect by an increase in the total $\Delta p$, this flow increases in proportion to $\Delta p$. The adjustment of the stress of the spring 108 is therefore proportional to $\gamma$.

Figure 4:
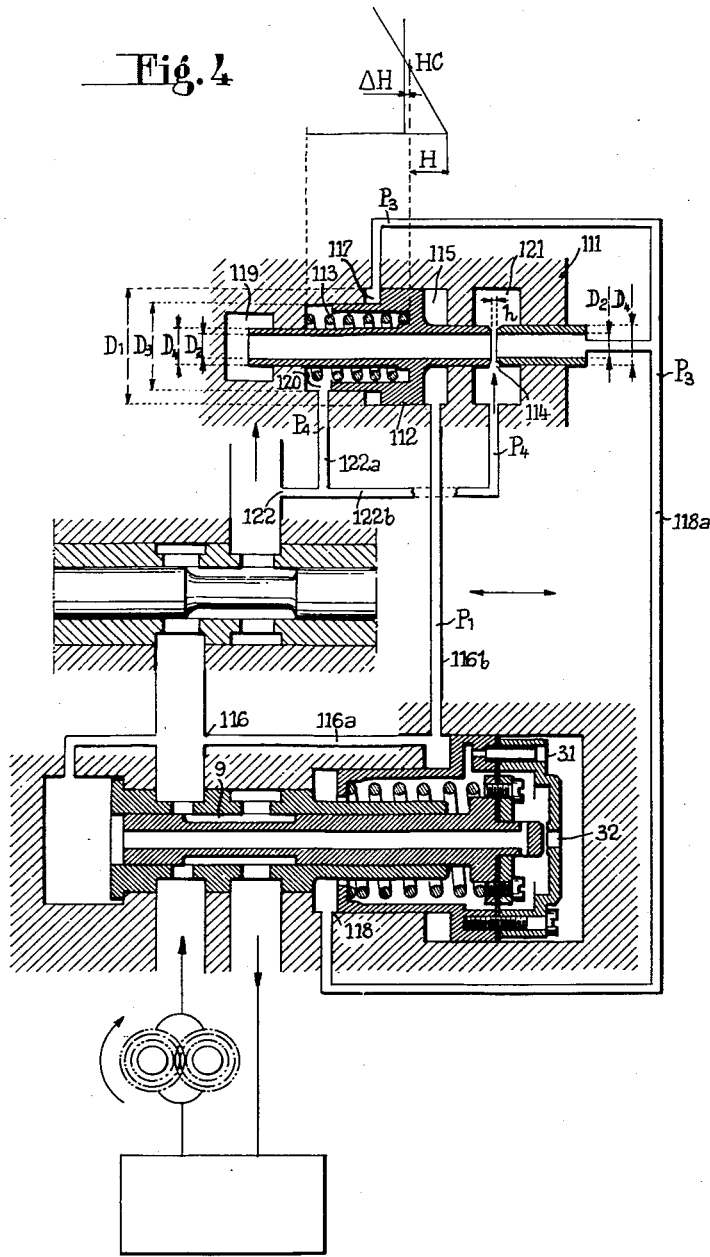
FIG. 4 is a diagrammatic view of another regulator embodying the invention.

The embodiment shown in FIG. 4 differs from that shown in FIG. 2 mainly in that the jet of the compensating device is inserted in the part of the auxiliary circuit between the downstream side of the regulator and a pressure communication aperture on the downstream side of the metering aperture.

A great number of elements of this regulator are identical to those of the regulator shown in FIG. 2 and it is therefore sufficient to describe hereinafter the characteristics proper to this second embodiment.

The compensating device 111 comprises a hollow differential piston 112 which is slidable in three bores of different diameters $D_1$, $D_3$, $D_4$, in opposition to the action of a return spring 113.

This piston is provided with the moving element of an adjustable jet 114.

This device defines five chambers which can receive three different pressures, namely: the chamber 115 subjected to the action of the pressure $P_1$ in the pipe 116 on the upstream side of the $\Delta p$ regulator and in the pipes 116a, 116b; the chamber 117, subjected to the pressure $P_3$ (downstream pressure) entering the aperture 118 in the $\Delta p$ regulator at the outlet of the auxiliary circuit and contained in the pipe 118a; the chamber 119 which is filled through the bore $D_2$ and is in consequence also subjected to the pressure $P_3$; the chambers 120 and 121, subjected to the pressure $P_4$ entering the aperture 122 on the downstream side of the metering aperture and supplied to these chambers by the pipes 122a and 122b.

This device operates in a similar manner to the device shown in FIG. 2.

A circular sectional surface having a diameter $Dm$ will be termed hereinafter "$Dm$ section" and an annular sectional surface between two circles having diameters $m$ and $n$ will be termed "$Dm$–$Dn$ sections."

The differential piston is in equilibrium between two groups of opposed forces:

On the left end of the piston (as viewed in FIG. 4) there are applied: the force HC of the spring, which is substantially proportional to the displacement H of the piston; the pressure $P_3$ on the section $D_1$–$D_3$; the pressure $P_4$ on the section $D_3$–$D_4$;

On the right end of the piston there is applied the pressure $P_1$ on the section $D_1$–$D_4$.

With regard to the forces exerted on the two ends of the piston rod, since the annular sections $D_1$–$D_2$, on which the pressures $P_3$ and $P_4$ are exerted, have a small area, it can be considered that in practice these forces cancel one another out.

The shoulders or steps of the piston, on the one hand, and the force and the characteristics of the spring on the other, are so arranged that there corresponds to an increase in $\Delta p$, which could occur from the dynamic forces of the fluid on the recess 9 of the slide of the regulating valve, an equivalent decrease in the pressure drop in the adjustable jet, which decrease therefore comprises the increase in $\Delta p$.

Although specific embodiments of the invention have been described, many modifications and changes may be made therein without departing from the scope of the invention as defined in the appended claims.

The improvement of the invention is applicable whenever in the various applications of the $\Delta p$ regulator dynamic forces are exerted against the distributor slide.

Having now described my invention what I claim as new and desire to secure by Letters Patent is:

1. In a valve unit regulating the pressure drop $\Delta p$ of a liquid flowing through a metering aperture inserted in a liquid supply pipe and having a variable cross-sectional area, said regulation being obtained by regulating the effective cross-sectional area of a discharge aperture which communicates with said supply pipe on the upstream side of the metering aperture and discharges the excess liquid supplied to the upstream side of the metering aperture, a valve comprising a fixed sleeve, a liquid inlet aperture and a liquid outlet aperture in the sleeve, said inlet aperture constituting said discharge aperture, a slide slidable in the sleeve for uncovering a variable portion of the cross-sectional area of said discharge aperture and a detector having a balancing spring and subjected to the pressures prevailing in said supply pipe upstream and downstream of said metering aperture; said valve unit further comprising an upstream aperture disposed on the upstream side of the metering aperture and communicating with the liquid pressure in the supply pipe on the upstream side of the metering aperture, a downstream aperture disposed on the downstream side of the metering aperture and communicating with the liquid pressure in the supply pipe on the downstream side of the metering aperture, a passageway putting the upstream aperture in communication with the downstream aperture, through said detector, said valve being inserted in said passageway, and a variable jet inserted in said passageway, the calibration of said balancing spring being decreased relative to the calibration of said opposing spring, said variable jet creating an additional pressure drop which is regulatable for exactly compensating the variations in the pressure drop $\Delta p$ non-compensated by said valve.

2. A valve regulating unit as claimed in claim 1, wherein said variable jet is inserted between said upstream aperture and said valve.

3. A valve regulating unit as claimed in claim 1, wherein said variable jet is inserted between said valve and said downstream aperture.

References Cited in the file of this patent

UNITED STATES PATENTS

| | | |
|---|---|---|
| 2,642,077 | Waterman | June 16, 1953 |
| 2,703,961 | Harding | Mar. 15, 1955 |
| 2,765,800 | Drake | Oct. 9, 1956 |
| 2,957,488 | Farkas | Oct. 25, 1960 |